Patented Sept. 25, 1951

2,568,738

UNITED STATES PATENT OFFICE 2,568,738

PROCESS FOR RESOLVING EMULSIONS

Willard H. Kirkpatrick, Sugar Land, Tex., and Doyne L. Wilson, Bellflower, Calif., assignors to Visco Products Company, Houston, Tex., a corporation of Delaware No Drawing. Application April 15, 1947,
Serial No. 741,678

9 Claims. (Cl. 252—341)

This invention relates in particular to the treatment of emulsions of mineral oil and water, such as petroleum emulsions commonly encountered in the production, handling and refining of crude mineral oil, for the purpose of separating the oil from the water. Also the invention relates to the treatment of other water-in-oil type of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One object of our invention is to provide a novel and economical process for resolving emulsions of the character referred to into their component parts of oil and water or brines.

Another object is to provide a novel reagent which is water-wettable, interfacial and surface-active in order to enable its use as a demulsifier or for such uses where surface-active characteristics are necessary or desirable.

This process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

The treating reagent employed in accordance with the present invention consists of a reaction product resulting from the condensation of a modified alkyolamine and a detergent forming body, preferably a fatty body, which may or may not be modified.

Our preferred alkylolamine is triethanolamine which is a viscous and very hygroscopic liquid which boils at 244° C. at 50 mm. The commercial product which is used for the purpose of the invention contains not more than 2.5% monoethanolamine and not more than 15% diethanolamine and not less than 80% triethanolamine. The neutral equivalent of the commercial product will average about 140 and is entirely satisfactory for our purposes. The triethanolamine may be modified by condensation in the presence of zinc chloride and/or other metallic salts at an elevated temperature with or without molecular dehydration.

The term condensation is used herein as defined by Hackh's Chemical Dictionary, 3rd edition (1944), pages 219, 220, to cover a union and combination of similar molecules to form a more complex compound (polymerization, etc.). The preferred condensing agents are acidic salts of metals (e. g. iron, aluminum, chromium and zinc) which form amphoteric hydroxides. By acidic salts is meant those salts having an electronegative charge greater than the electronegative charge of the —OH ion. For the most part these acidic salts are salts of strong acids, e. g., chlorides, nitrates, phosphates, sulfonates, sulfates and sulfamates. In this reaction the term dehydration is used to refer to the elimination of water which forms by the splitting of two hydroxy groups present in the alkylolamine molecule or molecules. This term does not refer to the simple removal of contaminating water to yield an anhydrous material.

It is also to be noted that triethanolamine may be molecularly dehydrated in the absence of any catalyst to yield a modified triethanolamine with desirable properties. This dehydration results from the loss of one or more molecules of water from the hydroxy (—OH) radicals which are present in the commercial triethanolamine.

The modification of triethanolamine results in a particularly viscous or thickened material which retains the characteristic solubility in water and alcohols and the solubility in hydrocarbons is increased over the parent material. The modified products are more alkaline than the original triethanolamine and possess unusual properties which are not usually associated with the unmodified triethanolamine. Other alkylolamines, particularly tertiary alkylolamines having three or more hydroxyl groups in the molecule, are equally well suited for the purposes of this invention. Since triethanolamine is readily available commercially in ample quantities, we prefer to use this alkylolamine.

Another means of modifying alkylolamines to yield products suitable for the purposes of this invention is to polymerize the hydroxyamino body in the presence of acidic salts of metals at elevated temperatures without the loss of chemically combined water. Additionally, it has been found that polymerizing in the presence of sulfur, boron fluoride, and other similar bodies which are not acidic salts of metals yields products satisfactory for the purposes of this invention. It should be noted that in those cases where water is distilled away from the reaction product in the presence of acidic salts of the type described that the resulting products are modified both by dehydration and polymerization. There is little evidence available to indicate the nature and constitution of the materials resulting from the dehydration and/or polymerization reaction.

Other examples of suitable primary, secondary, and tertiary alkylolamines for these purpose are as follows: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2-amino-2-methyl-1-propanol, octadecyldiethanolamine, polyethanolamine, etc. Alkylolamines with ether linkages in the alkyl group are intended as functional equivalents.

The detergent forming bodies which are suitable for use in this invention are those detergent forming bodies possessing an acidic function and containing a hydrocarbon structure of at least 8 carbon atoms and preferably not more than 32 carbon atoms. Thus, fatty bodies may be used, as the free fatty acids or as the glycerides of the fatty acids. Although castor oil is our preferred fatty body, other higher fatty bodies and other detergent forming acids including resin or rosin acids, naphthenic acids and their esters are suitable provided that the hydrocarbon structure contains at least 8 carbon atoms, preferably in an acyclic or open chain. When the detergent forming body is modified by blowing or other treatments hereinafter described, it should preferably be unsaturated (e. g., oleic acid, ricinoleic acid, undecylenic acid, linoleic acid, mixed fatty unsaturated acids and resin acids, or monocarboxylic resin acids such as rosin, cracked copals, etc.).

As has been indicated the detergent forming body may be used as such or may be modified by blowing, treating with sulphur, or by the saturation of the double bond with a reagent which does not materially increase the acidity of the resulting compound. Oxidation of a fatty body by blowing with air, oxygen, or ozone, reaction with sulphur, reaction with ethylene oxide are examples of types of modification which are of value in this invention.

The preparation of the condensation product of a modified alkylolamine or its equivalent with a detergent forming body which may or may not be modified is carried out in any of the well known conventional condensation procedures with or without catalysts. We prefer to carry out the condensation reaction by mixing the modified alkylolamine body and the fatty body in a suitable solvent which is adaptable to azeotropic distillation. It is to be noted that the use of a solvent is not essential but in many instances its use may facilitate the reaction. Likewise, the use of catalysts such as sulphuric acid and other acidic agents may facilitate the reaction.

It has been found that excellent products can be prepared by modifying the alkylolamines in situ, that is to say that the modification reaction is carried on simultaneously during the condensation with modified or non-modified fatty bodies. For certain specific emulsions the products thus prepared have been particularly effective. In these instances the superiority of these products is undoubtedly due to inter-molecular linkages which are not formed when the modification reactions are carried out separately.

It has long been known that various unsaturated materials can be blown or oxidized so as to yield materials which differ in chemical and physical properties and characteristics from the parent materials from which they were derived. The oxidation operation is generally conducted by means of relatively dry air. Oxygen, ozone, ozonized air or a mixture of the same may be used. The blowing process may be conducted at atmospheric pressure or may be conducted at increased pressure. Oxidation may be carried out with or without catalysts at relatively low temperatures and may be conducted at much higher temperatures. The period of blowing may vary from a relative short time to as long as several days. During the blowing operation hydroxyl groups are introduced at the unsaturated linkages of the materials being treated. One such explanation of the mode of reaction is that oxygen is first absorbed and thus saturates the ethylene linkage and this upon further reaction with water yields two hydroxyl groups.

In order to illustrate specifically the new type of materials contemplated for use in accordance with the present invention, the following examples are set forth below as being typical of products suitable for use. It is to be understood, however, that we do not confine ourselves to the specific chemicals or proportions thereof, set forth in these examples as it will be obvious that equivalents of these chemicals and other proportions may be used without departing from the spirit of the invention and the scope of the appended claims.

*Example I*

In order to prepare the modified triethanolamine, 700 parts of commercial triethanolamine and 35 parts of zinc chloride were placed in a three-necked balloon flask. The temperature was applied and gradually increased to effect the loss of aqueous distillate in the amount of 150 parts. A total of 12 hours was required to secure this amount of distillate at a maximum temperature of 230° C. The aqueous distillate began to form at 177° C.

To 630 parts of No. 3 castor oil contained in a three-necked balloon flask there was added 300 parts of the modified triethanolamine as prepared above, and 100 parts of a suitable hydrocarbon solvent which is adaptable to azeotropic distillation. The flask was equipped with a stirrer, thermometer and a moisture trap to permit the collection of the aqueous distillate as it forms and the return of the hydrocarbon solvent to the reaction mass. The mixture was heated with stirring for 12 hours at a temperature range of 160° to 225° C. During this heating a total of 66 parts of aqueous distillate was secured.

The condensed intermediate was then thinned to a suitable viscosity by the addition of 100 parts of a hydrocarbon solvent and 25 parts of a suitable alcohol, such as isopropanol. To 325 parts of the thinned condensed intermediate there was added 15 parts of commercial muriatic acid to partially neutralize the basicity of the material. The resulting product was brilliantly clear and may be used for breaking water-in-oil type emulsion.

*Example II*

In a three-necked balloon flask provided with a stirrer, thermometer and a water trap for the removal of aqueous distillate there was mixed 630 parts of castor oil, 300 parts of commercial triethanolamine, 10 parts of zinc chloride and 300 parts of hydrocarbon solvent which permits azeotropic distillation. This mixture was heated with stirring to effect the loss of an aqueous distillate in the amount of 77 parts.

The log of distillation was as follows:

| Time | Temperature | Volume Aqueous Distillate |
| --- | --- | --- |
| | °C. | Cc. |
| 11 a. m | 175 | Began |
| 12 N | 194 | 13 |
| 3 p. m | 198 | 29 |
| 7 p. m | 202 | 65 |
| 11 p. m | 205 | 77 |

The product resulting from the above condensation reaction was collected and 200 parts of a suitable hydrocarbon solvent was added with stirring to adjust viscosity.

This example shows that it is possible for triethanolamine to be modified in situ during the course of the condensation with a fatty body. In some instances it has been found more desirable to modify the triethanolamine in situ rather than in a separate reaction.

*Example III*

In a three-necked balloon flask equipped with a stirrer, thermometer and an inlet tube for air, there was placed 680 parts of castor oil. The contents of the flask were heated to 210° C. while a moderate stream of moist air was passed through the liquid for a period of 13 hours, at the end of which time it had reached the desired degree of blowing as indicated by its livery appearance at room temperature.

To 630 parts of the modified castor oil was added 310 parts of the modified triethanolamine as described in Example I. The mass was heated with stirring until a total of 60 parts of aqueous distillate had come over in 12 hours at a temperature between 170° C. and 230° C.

To 200 parts of the above condensation product there was added 15 parts of commercial muriatic acid to partially neutralize the basicity of the product. Then 100 parts of a hydrocarbon solvent and 25 parts of isopropanol were stirred into the mass to yield the finished product.

*Example IV*

In a three-necked balloon flask 1200 parts of triisopropanolamine were heated with stirring until a total of 300 parts of aqueous distillate had been secured from the reaction mass.

A mixture of 600 parts of blown castor oil was prepared according to Example III and 300 parts of the above modified triisopropanolamine was condensed in the presence of 100 parts of a suitable solvent that is adaptable to azeotropic distillation. After the collection of 70 parts of aqueous distillate, the mass was cooled and 150 parts of a hydrocarbon solvent was added to yield the finished product.

*Example V*

To 600 parts of triolein and 300 parts of triethanolamine, there was added 300 parts of a suitable azeotropic solvent. The mixture was heated to effect the loss of water and a total of 80 parts of aqueous distillate was secured in 16 hours at a maximum temperature of 210° C. The condensed modified mass was allowed to cool and 200 parts of a hydrocarbon solvent was added with stirring to yield the finished product.

*Example VI*

The modification of 700 parts of triethanolamine was carried out in the presence of 35 parts of zinc chloride by heating the mass with stirring at 175° C. to 180° C. for a period of 8 hours. Extreme care was exercised to prevent the distillation of any aqueous phase from the reaction mass.

The modified triethanolamine was condensed with the blown castor oil in a manner similar to that described in Example III. After the addition of a desired quantity of hydrocarbon diluent to yield a product having a desirable viscosity the material was suitable for breaking water-in-oil emulsions.

*Example VII*

Three hundred ten parts of modified triethanolamine as described in Example VI was mixed with 630 parts of castor oil and 100 parts of an azeotropic solvent. The mixture was heated to secure 60 parts of aqueous distillate in 12 hours over a temperature range of 162° C. to 223° C. The condensation product was dull in appearance.

By adding 15 parts of muriatic acid to 200 parts of the above condensation product in the presence of 100 parts of a hydrocarbon solvent and 25 parts of isopropanol, dullness disappears yielding a brilliantly clear product which was suitable for our purposes. It is to be noted that the product was only partially neutralized and in no case was an excess of mineral acid used.

*Example VIII*

Approximately 6,000 pounds of tall oil, 4,000 pounds of polyethylene glycol 400 and 200 pounds of an alkylated aryl sulfonic acid (e. g., isopropyl, mono-amyl, and/or diamyl naphthalene sulfonic acids) were charged into a processing kettle. The temperature was raised with agitation and at about 140° C. an aqueous-like distillate began to form. Heating was continued until a total of 430 pounds of distillate had been condensed from the reaction. The maximum temperature reached during this reaction was about 290° C. The reaction mass was then cooled to 80° and pumped over to yield the desired ester intermediate.

Fifty-seven hundred pounds of this ester intermediate, 2820 pounds of triethanolamine and 125 gallons of a suitable hydrocarbon fraction such as $SO_2$ extract were charged into the processing kettle and heated to 95°. At this temperature 95 pounds of zinc chloride were added and the temperature raised until an aqueous-like distillate began to form at a temperature of approximately 190°. Heating was continued until a total of 485 pounds of distillate was secured at a maximum temperature approximating 250° C. The reaction mass was then cooled to approximately 120°. When the mass was cooled to this temperature, 225 gallons of a Gray Tower residue was added with agitation. The mass was further cooled and pumped over to storage to yield the finished material.

The above examples are only a few of the many products which may be prepared according to the principles disclosed in the foregoing discussion. Various examples of the many products which answer the description herein made are contemplated; some may be oil soluble and others water soluble, and in many instances they may possess dual solubility to an appreciable extent. The suitability of any of the products for the breaking and resolving of any given emulsion can readily be determined by conventional procedures. The products may be used as such for resolving emulsions of the water-in-oil type or they may be admixed with other demulsifying reagents in varying ratios as required by the problem at hand.

In preparing condensation products for the purpose of the invention, it is preferable to employ a ratio of detergent forming body to modified alkylolamine within the molal ratio of 3:1 to 1:3, calculated on the basis of acidic groups to amino groups in the monomeric material.

In the preparation of blown oils for the purpose of the invention, the oxidation or blowing of the oils is carried out sufficiently long to induce a thickening of the oil. Where air is employed as the blowing agent this usually requires around 10 to 20 hours at temperatures around 200–210° C. until the oil has been sufficiently blown to yield a tacky product when cooled to ordinary room temperature (25° C.).

The suitable hydrocarbon vehicle referred to in the examples is sulphur dioxide ($SO_2$) extract. This material is a by-product from the Edeleanu process of refining petroleum in which the undesirable fractions are removed by extraction with liquid sulphur dioxide. After removal of the sulphur dioxide a mixture of hydrocarbons, substantially aromatic in character, remains which is designated in the trade as $SO_2$ extract.

Examples of other suitable hydrocarbon vehicles are toluene, xylene, gas oil, diesel fuel, bunker fuel and coal tar solvent. The above cited examples of solvents are adaptable to azeotropic distillation as would also be any other solvent which is immiscible with water, miscible with the reacting mass and has a boiling point or boiling range in excess of the boiling point of water.

In Example VIII the 200 pounds of an alkylated aryl sulfonic acid is used only as a catalyst to facilitate the esterification reaction, between tall oil and polyethylene glycol 400. The alkylated aryl sulfonic acid is not required for the process and is not functionally involved in the reaction. The same product can be made without the use of any catalyst and if the use of a catalyst is desired other agents such as sulphuric acid, chloro-sulfonic acid and the like may be employed.

The improved demulsifying reagents prepared in accordance with the present invention are preferably used in the proportion of one part of reagent to from 2,000 to 30,000 parts of emulsion either by adding the concentrated product directly to the emulsion or after diluting with a suitable vehicle in the customary manner.

It may be observed that the products employed in the practice of the invention differ quite markedly depending upon the manner in which the alkylolamine has been modified. For example, the alkylolamine products, resulting from an acidic condensation reacted with a detergent forming body as previously described, produced a different result in the treatment of water-in-oil emulsions than the products obtained by polymerization in the absence of an acidic condensation agent. As an illustration, the reaction products involving an acidic condensation when tested on California water-in-oil emulsions derived from the San Joaquin Valley area were far superior in the treatment of such emulsions to the products prepared without an acidic condensation agent. On the other hand, the products prepared without an acidic condensation agent were superior to the products prepared with an acidic condensation agent when tested on water-in-oil emulsions in the midcontinent fields. Although the invention is not limited to any theory it appears that the product prepared with acidic condensation agents are more effective in the treatment of water-in-oil emulsions where the oils are essentially asphalt base oils, and the products prepared without acidic condensation agents are more effective in the treatment of water-in-oil emulsions where the oils are mixed naphthenic-asphalt base oils.

Having thus described the invention, what we claim as new and desire to secure by Letters Patent of the United States is:

1. A process for the resolution of a water-in-oil emulsion which comprises subjecting said emulsion to the action of a quantity of a condensation product of (a) a modified alkylolamine made by heating an alkylolamine containing at least two hydroxy groups in its molecule at a temperature of at least 175 degrees C. in the presence of an acidic condensing agent until a more viscous material is obtained and (b) at least one detergent forming body containing at least 8 carbon atoms in a hydrocarbon structure, said condensation being effected with the elimination of an aqueous distillate at a temperature of at least 160 degrees C. to form a water wettable surface active product, the ratio of said detergent forming body to said modified alkylolamine corresponding to a molal ratio of 3:1 to 1:3 calculated on the basis of acidic groups in the detergent forming body to amino groups in the monomeric alkylolamine, said quantity being sufficient to effect a separation of water from oil in said emulsion.

2. A process for the resolution of a water-in-oil emulsion which comprises subjecting said emulsion to the action of a quantity of a condensation product of (a) a modified alkylolamine made by heating an alkylolamine containing at least two hydroxy groups in its molecule at a temperature of at least 175 degrees C. in the presence of an acidic condensing agent until a more viscous material is obtained and (b) at least one detergent forming body containing at least 8 and not more than 32 carbon atoms in its molecule, said condensation being effected with the elimination of an aqueous distillate at a temperature of at least 160 degrees C. to form a water wettable surface active product, the ratio of said detergent forming body to said modified alkylolamine corresponding to a molal ratio of 3:1 to 1:3 calculated on the basis of acidic groups in the detergent forming body to amino groups in the monomeric alkylolamine, said quantity being sufficient to effect a separation of water from oil in said emulsion.

3. A process for the resolution of a water-in-oil emulsion which comprises subjecting said emulsion to the action of a quantity of a condensation product of (a) a modified alkylolamine made by heating an alkylolamine containing at least three hydroxy groups in its molecule at a temperature of at least 175 degrees C. in the presence of an acidic condensing agent until a more viscous material is obtained and (b) at least one detergent forming body containing at least 8 carbon atoms in a hydrocarbon structure, said condensation being effected with the elimination of an aqueous distillate at a temperature of at least 160 degrees C. to form a water wettable surface active product, the ratio of said detergent forming body to said modified alkylolamine corresponding to a molal ratio of 3:1 to 1:3 calculated on the basis of acidic groups in the detergent forming body to amino groups in the monomeric alkylolamine, said quantity being sufficient to effect a separation of water from oil in said emulsion.

4. A process for the resolution of a water-in-oil emulsion which comprises subjecting said emulsion to the action of a quantity of a condensation product of (a) a modified alkylolamine made by heating an alkylolamine containing at least two hydroxy groups in its molecule at a temperature of at least 175 degrees C. in the presence of an acidic salt of a metal which forms an amphoteric hydroxide until a more viscous material is obtained and (b) at least one detergent forming body containing at least 8 carbon atoms in a hydrocarbon structure, said condensation being effected with the elimination of an aqueous distillate at a temperature of at least 160 degrees C. to form a water wettable surface active product, the ratio of said detergent forming body to said modified alkylolamine corresponding to a molal ratio of 3:1 to 1:3 calculated on the basis of acidic groups in the detergent forming body to amino groups in the monomeric alkylolamine, said quantity being sufficient to effect a separation of water from oil in said emulsion.

5. A process for the resolution of a water-in-oil emulsion which comprises subjecting said emulsion to the action of a quantity of a condensation product of (a) a modified alkylolamine made by heating an alkylolamine containing at least two hydroxy groups in its molecule at a temperature of at least 175 degrees C. in the presence of zinc chloride until a more viscous material is obtained and (b) at least one detergent forming body containing at least 8 carbon atoms in a hydrocarbon structure, said condensation being effected with the elimination of an aqueous distillate at a temperature of at least 160 degrees C. to form a water wettable surface active product, the ratio of said detergent forming body to said modified alkylolamine corresponding to a molal ratio of 3:1 to 1:3 calculated on the basis of acidic groups in the detergent forming body to amino groups in the monomeric alkylolamine, said quantity being sufficient to effect a separation of water from oil in said emulsion.

6. A process for the resolution of a water-in-oil emulsion which comprises subjecting said emulsion to the action of a quantity of a condensation product of (a) a modified alkylolamine made by heating triethanolamine in the presence of zinc chloride at a temperature within the range of 175 degrees C. to 230 degrees C. until a more viscous and more alkaline material is obtained and (b) a fatty body containing a fatty acid having at least 8 and not more than 32 carbon atoms in its molecule, said condensation being effected with the elimination of an aqueous distillate at a temperature of at least 160 degrees C. to form a water wettable surface active product, the ratio of fatty acid to triethanolamine being within the molal ratio of 3:1 to 1:3 and said quantity being sufficient to effect a separation of water from oil in said emulsion.

7. A process as claimed in claim 1 in which said condensation product is at least partially neutralized with an acid.

8. A process as claimed in claim 6 in which said fatty body is a blown unsaturated fatty oil.

9. A process for the resolution of water-in-oil emulsions of the type found in the San Joaquin Valley of California which comprises treating such emulsions with a quantity of a condensation product of (a) a modified alkylolamine made by heating triethanolamine with approximately 5% by weight of zinc chloride at a temperature of at least 175 degrees C. until a more viscous and more alkaline material is formed and (b) castor oil, said condensation being effected at a temperature of at least 160 degrees C. with the elimination of an aqueous distillate to form a water wettable surface active product, the ratio of fatty acid groups in the castor oil to amino groups in the triethanolamine corresponding to a molal ratio within the range of 3:1 to 1:3, said quantity being sufficient to effect a separation of water from oil in said emulsion.

WILLARD H. KIRKPATRICK.
DOYNE L. WILSON.

REFERENCES CITED

The following references are of record in the file of this patent:

UNITED STATES PATENTS

| Number | Name | Date |
| --- | --- | --- |
| 2,206,928 | Ulrich | July 9, 1940 |
| 2,262,742 | De Groote | Nov. 11, 1941 |
| 2,306,775 | Blair | Dec. 29, 1942 |
| 2,324,488 | De Groote | July 20, 1943 |
| 2,342,650 | De Groote | Feb. 29, 1944 |
| 2,368,208 | Epstein et al. | Jan. 30, 1945 |
| 2,407,895 | Monson et al. | Sept. 17, 1946 |